Figure 1:
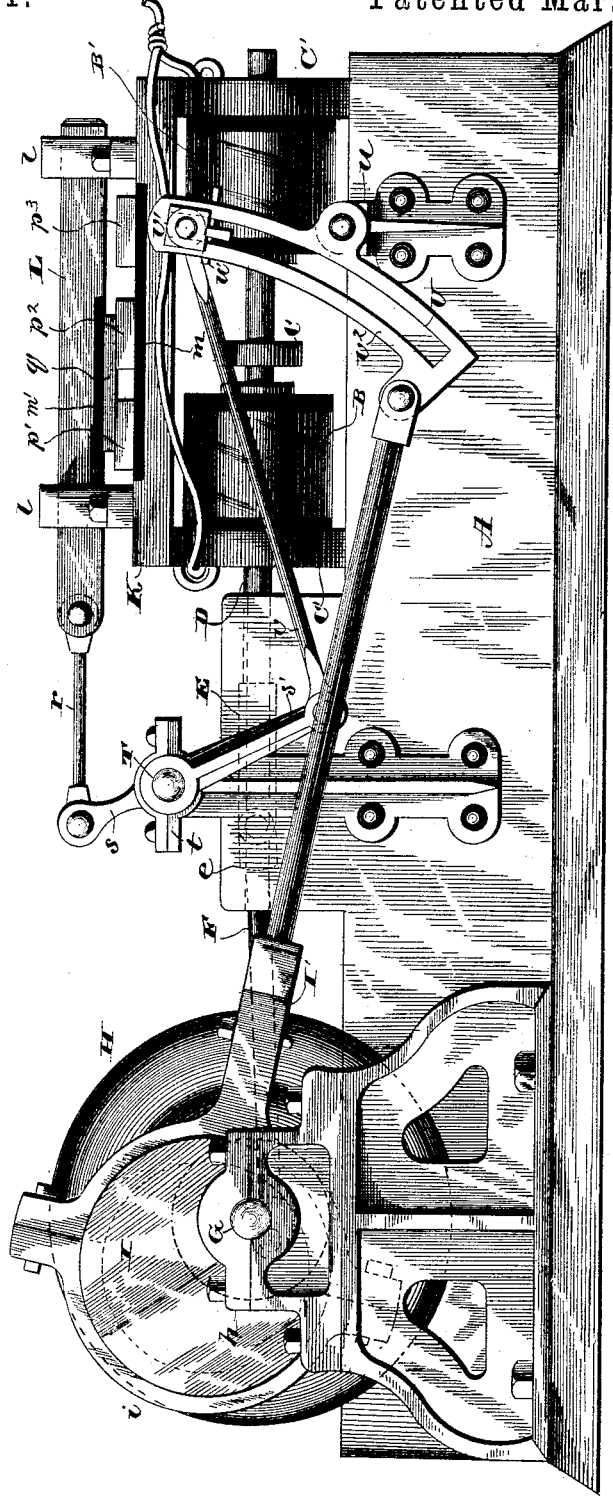

(No Model.)  2 Sheets—Sheet 1.
W. H. DARLING.
ELECTRO MAGNETIC MOTOR.

No. 337,931.  Patented Mar. 16, 1886.

WITNESSES  INVENTOR (No Model.) 2 Sheets—Sheet 2.
W. H. DARLING.
ELECTRO MAGNETIC MOTOR.
No. 337,931. Patented Mar. 16, 1886.
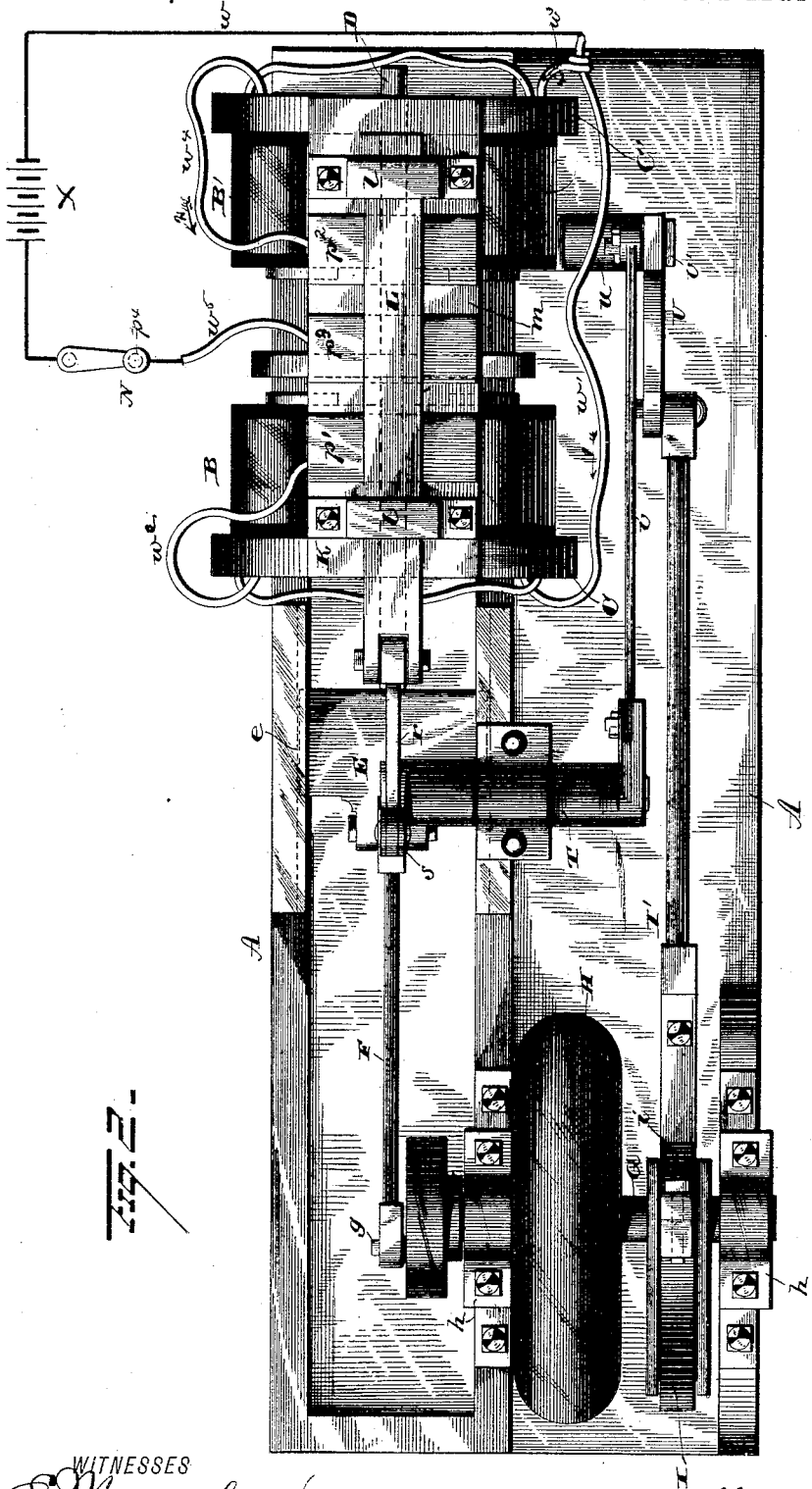
WITNESSES
INVENTOR

UNITED STATES PATENT OFFICE.

WILLIAM H. DARLING, OF NEW YORK, N. Y., ASSIGNOR OF ONE-HALF TO GARDNER P. HARRINGTON, OF SAME PLACE.

ELECTRO-MAGNETIC MOTOR.

SPECIFICATION forming part of Letters Patent No. 337,931, dated March 16, 1886.

Application filed November 19, 1885. Serial No. 183,318. (No model.)

*To all whom it may concern:*

Be it known that I, WILLIAM H. DARLING, of New York, in the county of New York and State of New York, have invented certain new and useful Improvements in Electro-Magnetic Engines or Motors; and I do hereby declare the following to be a full, clear, and exact description of the invention, such as will enable others skilled in the art to which it appertains to make and use the same.

My invention relates to double-acting reciprocating electro-magnetic engines or motors; and its main object is to provide motors of this class with simple and reliable direct-acting devices for changing the electric current from the coil or coils of an electro magnet or magnets arranged to move an armature in one direction to the coil or coils of a similar magnet or magnets arranged to move said armature in the opposite direction.

It has the further object to provide engines of this class with simple and easily-operated reversing-gears.

With these objects in view my invention consists in certain novel constructions and combinations of devices, which may be readily understood from the following particular description, in connection with the accompanying drawings, and the novel features of which will be definitely pointed out in the appended claims.

In the drawings, Figure 1 is a side elevation of my improved double-acting electric reciprocating engine. Fig. 2 is a top view of the same.

The letter A indicates the side walls of a foundation or frame, upon which, near one end, are arranged two electro-magnets, B B', with the poles of one magnet facing those of the other, and separated therefrom by a suitable space for the play of a reciprocating armature, C, which is to be alternately attracted by the two magnets. This armature C is fixed upon a longitudinally-reciprocating rod, D, having bearings formed for it through the yoke-pieces C' C' of the electro-magnets, and at one end it is connected to one side of a cross-head, E, mounted in guides $e$ $e$, and having its other side pivoted to pitman-rod F, which connects it with a crank-pin, $g$, of a shaft, G, mounted in bearings $h$ $h$, and carrying a fly-wheel, H, and an eccentric, I, the function of which will be presently described.

Lying upon and supported, in the present instance, by the yokes C' C' of the two electro-magnets is a metal plate or slab, K, upon the upper face of which are two guide-brackets, $l$ $l$, for a reciprocating metal bar, L.

Between the brackets $l$ $l$ a plate, $m$, of hard rubber or other non-conductor of electricity, is secured to the upper face of the slab K, and upon this plate $m$, of non-conducting material, are fixed three metallic contact-plates, $p'$ $p^2$ $p^3$, insulated from each other and from other metallic stationary parts.

The letter X indicates an electric generator, which is here only conventionally represented, but which may be of any convenient kind—as, for instance, a chemical battery or magneto or dynamo electric machine. From one pole of this generator leads a conductor, $w$, preferably an insulated wire, from which a branch, $w'$, connects to one terminal of the coils of electro-magnet B, having their other terminal connected by a wire, $w^2$, to contact-plate $p'$. Another branch, $w^3$, connects with one terminal of the coils of electro-magnet B', having their other terminal connected to contact-plate $p^2$ by a wire, $w^4$.

The contact-plate $p^3$ is connected by a wire, $w^5$, with the contact-plate $p^4$ of a hand switch-lever, N, which is connected to the pole of the generator X opposite to that from which the wire $w$ leads.

The reciprocating metallic bar L has a portion of its under surface faced with hard rubber or other insulating material, $m'$, to which is secured a metallic bridge-plate, $q$, arranged to bear upon the plates $p'$, $p^2$, and $p^3$, and electrically connect plates $p'$ and $p^3$ or $p^2$ and $p^3$, according to the position of the said bar L. One end of the bar L is by a link, $r$, connected with an arm, $s$, projecting radially from a shaft, T, mounted in a bearing, $t$, and having another radially-projecting arm, $s'$, to one end of which is pivoted a link, $v$, having its other end pivoted to a block, $v'$, which is adjustable in the arc-shaped slot $v^2$ of a reversing-link, U, pivoted at its middle to a stationary support, u.

A pin, u', passed through the block v' and suitable holes in the reversing-link, will secure the said block at either end of the link, as desired.

The eccentric I is surrounded by a strap, i, from which extends an eccentric-rod, I', connecting the strap with the lower end of the reversing-link U.

The throw of the reciprocating bar L is so adjusted that at one end of its stroke the bridge-plate q will electrically connect the contact-plates p and p³, and at the other end it will connect plates p² and p³; but at no part of the stroke will the said bridge-plate connect all three of the contact-plates.

The operation of the engine is as follows: We will suppose that the reciprocating bar L is at one end of its stroke and the bridge-plate q connects the contact-plates p' and p³. Now, if the switch N be closed, as shown in full lines, Fig. 2, the current from the generator will flow, as indicated by arrows No. 1, over conductor w, and, following branch w', will traverse the coils of electro-magnet B, pass over wire w², contact-plate p', bridge-plate q, contact-plate p³, wire w⁵, and switch N, back to the generator. The cores of magnet B will thus be energized and attract the armature C, thus moving the rod D and pitman F to turn the shaft G and eccentric I, so that the eccentric-rod I' vibrates the reversing-link U, which acts, through link v, arm s', shaft T, arm s, and link r, to change the position of bar L to the opposite end of its throw, so that it will then connect the contact-plates p³ and p², after breaking connection between plates p' and p³. The current now, instead of flowing over branch w', will flow as indicated by arrows No. 2—that is, over branch conductor w³, coils of electro-magnet B', wire w⁴, contact-plate p², bridge-plate q, contact-plate p³, wire w⁵, &c., to generator. The cores of magnet B' being now energized and those of magnet B demagnetized, the magnet B' will attract armature C, moving it and the rod D and pitman F in direction opposite that in which they were moved by the magnet B, but so as to continue the revolution of shaft G, which, through the other connected parts, will at the proper time again shift the bar L to take the current back to the coils of electro-magnet B, and the motion of the engine will thus be kept up as long as the circuit is closed and the current flows from the generator.

If at any time it is desired to reverse the motion of the engine, it may be accomplished by sliding the block v' from the end of the reversing-link to the opposite end and there securing it. This may be accomplished by first removing the pin u', seizing the rod v³, moving the block v' up or down, as desired, and then inserting the pin to secure the block v' in its new position.

While, for the sake of convenience of illustration and compactness of construction, I have shown the current-changing devices as supported by the yoke-pieces of the electro-magnets B B', it is obvious that they are not necessarily so arranged, but might be located in any position where convenient mechanical connection may be made from any moving part to the reciprocating bar L, for the purpose of giving said bar its proper reciprocating stroke.

It will be observed that my current-changing devices are analogous in operation to the valve-gear of a reciprocating steam-engine, and as my present improvement relates only to these current-changing devices I have shown no governor in connection with my engine; but it will be readily understood that an electrical governor may be applied thereto, according to the well-known state of the art of electrical engineering, for the purpose of regulating the speed of the engine by controlling the strength of the current which flows over the coils of the electro-magnets.

I do not limit myself of course to the use of any particular number of electro-magnets on each side of the reciprocating armature, as it is obvious that the armature might have an extended area and be attracted in each direction by two or more electro-magnets connected in circuit in well-known manners. Neither do I confine myself to the precise construction of any of the working parts as illustrated in my drawings, but reserve to myself the right to vary the same or substitute other parts therefor for the better carrying out of my invention without departing from essential principle thereof.

I am aware that it is not broadly new to actuate a reciprocating engine by means of electro-magnets operating upon its reciprocating parts, and this I do not claim, broadly, my invention consisting in the herein-described means for accomplishing that result.

Having fully described my invention, what I claim as new, and desire to secure by Letters Patent, is—

1. In a double-acting electro-magnetic engine, the combination, with the facing oppositely-acting electro-magnets, of the reciprocating armature arranged between said magnets, the two contact-plates forming terminals or electrodes of circuits through the coils of magnets on opposite sides of the armature, respectively, the intermediate contact-plate forming an opposite terminal or electrode to each of the other contact-plates, and the reciprocating bridge-plate arranged to traverse said contact-plates, and having connection with the armature through intermediate devices, substantially as described.

2. The combination, with the oppositely-arranged electro-magnets, intermediate reciprocating armature, and rod carrying said armature, of the slab K, supported by the yoke-pieces of said magnet, the insulated contact-plates supported by said slab, the reciprocating bar arranged in suitable guides and carrying the insulated bridge-plate $q$, arranged to traverse said contact-plates, the electrical circuits, and the intermediate mechanical connections between the said reciprocating bar and the armature, as set forth.

In testimony whereof I have signed this specification in the presence of two subscribing witnesses.

WILLIAM H. DARLING.

Witnesses:
 WM. B. KRUG,
 IRVING M. SHAW.